United States Patent [19]
Carley et al.

[11] Patent Number: 5,978,914
[45] Date of Patent: Nov. 2, 1999

[54] METHOD AND APPARATUS FOR PREVENTING INADVERTENT CHANGES TO SYSTEM-CRITICAL FILES IN A COMPUTING SYSTEM

[75] Inventors: William J. Carley; James M. Lyon, both of San Jose, Calif.; Matthew C. McCline, Bellevue, Wash.; Michael J. Skarpelos, San Jose, Calif.

[73] Assignee: Tandem Computers Incorporated, Cupertino, Calif.

[21] Appl. No.: 08/377,385

[22] Filed: Jan. 23, 1995

[51] Int. Cl.$^6$ ........................................ G06F 11/34
[52] U.S. Cl. ................................. 713/200; 713/202
[58] Field of Search ............................ 395/575, 425, 395/275, 600, 186, 188.01; 340/825.3; 371/40.1; 380/4, 25; 713/200, 202

[56] References Cited

U.S. PATENT DOCUMENTS

| | | | |
|---|---|---|---|
| 4,228,496 | 10/1980 | Katzman et al. | 364/200 |
| 4,947,318 | 8/1990 | Mineo | 364/200 |
| 5,032,979 | 7/1991 | Hecht et al. | 364/200 |
| 5,107,443 | 4/1992 | Smith et al. | 395/158 |
| 5,113,442 | 5/1992 | Moir | 380/25 |
| 5,235,642 | 8/1993 | Wobber et al. | 380/25 |
| 5,325,519 | 6/1994 | Long et al. | 395/575 |
| 5,365,587 | 11/1994 | Campbell et al. | 380/25 |
| 5,450,593 | 9/1995 | Howell et al. | 395/650 |

FOREIGN PATENT DOCUMENTS

| | | | |
|---|---|---|---|
| 0 387 172 A3 | 4/1992 | European Pat. Off. | G06F 9/40 |
| WO 91/13403 | 9/1991 | WIPO | G06F 12/14 |

Primary Examiner—Phung M. Chung
Attorney, Agent, or Firm—Townsend and Townsend and Crew LLLP

[57] ABSTRACT

System-critical files are protected from being inadvertently modified or deleted by placing them in a Reserve name space of storage that requires any process seeking modifying access to the Reserve name space to have a "Right" to do so. The right to modifying access is garnered by a process first making a call to a system library procedure that causes a memory-stored data structure associated with the calling process to be modified, identifying the process as one with a Right to make modifying access to the Reserve name space. Any attempt to modify, delete, or create any file residing in the Reserve name space without the Right will be refused.

15 Claims, 1 Drawing Sheet

METHOD AND APPARATUS FOR PREVENTING INADVERTENT CHANGES TO SYSTEM-CRITICAL FILES IN A COMPUTING SYSTEM

BACKGROUND OF THE INVENTION

The present invention is directed to data processing systems, and in particular to a method, and apparatus for implementing that method, of protecting files carried by a storage medium from inadvertently being modified, changed, or deleted.

In computing systems there are often created sensitive, system-critical files that must remain inviolate and/or protected against inadvertent modification. One example, and one to which the present invention is directed, of a system-critical file is an audit trail file that is used to track the history of changes made to a database. The audit trail file can be relied upon to reconstruct the database should it, for whatever reason, become corrupted, or otherwise lost. The application program or "process" responsible for managing and maintaining the database will periodically make changes or modifications to the managed database (e.g., adding or modifying a record, etc.). Each such change or modification to the database will result in the creation of an audit record to reflect the change. The audit record is appended to the associated audit trail file kept on disk.

Should some other process not associated with the audit trail file for some reason inadvertently modify or delete it, the likelihood exists that the ability to reconstruct the associated database has been lost. For this reason the audit trail file must be protected from inadvertent changes that will affect the ability to correctly reconstruct the associated data base. Thus, while read-only access may be granted to an audit trail file of a database (or other maintained data segment/structure), any modifying access to that audit trail file must be limited only those processes needing such access.

SUMMARY OF THE INVENTION

The present invention is used in the context of a processing system having secondary storage (e.g., disk) for keeping various files, including audit trail files. It is convenient for purposes not related to this invention to partition the name of the secondary storage according to component (i.e., which physical disk if more than one), sub-volume, and file name for all files on disk, including system-critical files, such as an audit trail file. Associated or related files may be stored in different sub-volumes. According to the invention, one of the sub-volumes is designated as a "Reserve" sub-volume for system-critical files, such as audit trail files of associated database structures.

Further, the system with which the invention is used is structured to provide various services, in the form of service processes, to the application processes (e.g., the database management process) in generally conventional fashion. Thus, if an application needs to access secondary storage, e.g., disk, it sends a request to the service process (the "disk process") responsible for managing that secondary storage (disk).

The present invention provides a method of limiting modifying access to the Reserve sub-volume to only those application processes having a need to make such access. All other processes may make read access for viewing any files maintained in the Reserve sub-volume, but any attempt to modify, delete, or create any file residing in the Reserve sub-volume will be refused.

Broadly, the method of the present invention involves providing application processes with the ability to identify themselves as having a "Right" to make modifying access to the sub-volume. This Right is included in the request for disk service sent by the application process to the disk process. If the request seeks modifying access to the reserve sub-volume, the disk process will check to see if the request contains the Right, and if not refuse to comply with the request.

According to an embodiment of the invention, the requests to the disk process for access will include a "Flag Word," containing information describing and relative to the requesting process. One bit of the Flag Word, when set to one state, identifies the requesting process as having the Right to make a modifying access of the reserved sub-volume area.

According to an additional embodiment of the invention, requests are assembled by an application process from information pulled from a data segment kept in a main memory and associated with the application process. The data segment includes information used by the associated process. Certain of that information is included in the service request to provide details about the requesting process (e.g., identity, and type, etc.), and will of course include the Flag Word. In order to obtain the Right to make a modifying access to a Reserve sub-volume, the application process must, at some time, make a call to a system library procedure which, in turn, will cause the bit in the Flag Word needed for modifying access to a Reserve sub-volume to be set to the proper state needed by the requesting process. This bit in the flag word will remain set for the life of the process.

There are a number of advantages to the method of the present invention. First, there is no need to create special service processes, as has been done in the past, for providing modifying access to system critical files. Rather, a service process may be conventional and available for use by any application process, including those needing to make a modifying access to a Reserve sub-volume. The particular service process need only the ability to determine, from the request, whether an application process requesting modifying access to a Reserve sub-volume has the proper Right.

The security afforded system-critical files by the present invention is in addition to the security furnished by more the conventional methods of requiring passwords or other known security devices.

These and other aspects and advantages of the present invention will become evident to those skilled in this art upon a reading of the following detailed description of the invention, which should be taken in conjunction with the accompanying drawings.

DETAILED DESCRIPTION OF THE INVENTION

Figure 1:
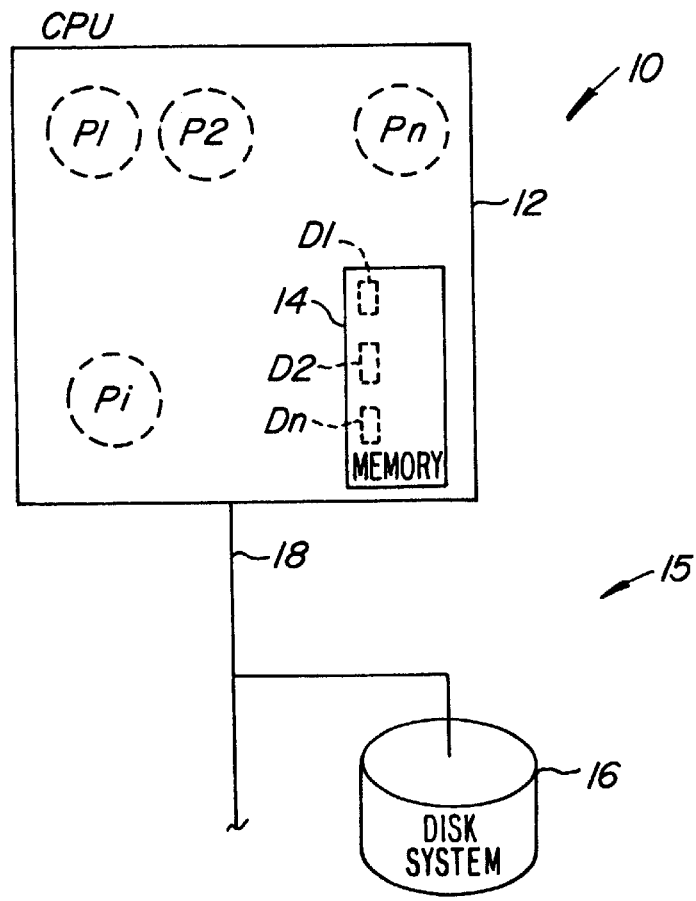
FIG. 1 is a representation of a processing system with which the invention may be used.

The present invention was developed for use in a multiple processor system such as illustrated in U.S. Pat. No. 4,228, 496. In the context of such a system, application processes operating on one of the multiple processors may request the service of a service process residing on another processor, such as a disk process responsible for managing, maintaining, and accessing that portion of the system's secondary storage implemented by disk storage. Interprocessor requests for service of a service process use a messaging system, and an interprocessor bus architecture, that permits messages to be routed between the multiple processors. However, if the application process requesting service and the requested service process reside on the same processor, the same messaging technique is used, except that the request message is not put on the interprocessor bus architecture, but is transferred internally within the processor and placed on a queue of the service process for processing. The details of the particular messaging system are not necessary to the understanding or use of the present invention, and therefore are not described. It should be mentioned, as those skilled in this art most likely have surmised, that the invention can be used in a variety of environments, including a single processor environment.

Further, the invention is described in the context of a database management system comprising an application management process and a disk process. In this context the disk process is responsible for responding to requests to create, modify, and/or delete data files, including audit trail files, in the secondary storage space implemented by disk. The actual implementation of the management system, and the creation and management of audit trail files in secondary storage, is somewhat complex, involving as it does the application management process, and the services of a data disk process (for performing the tasks of the actual formation, management, access to the stored database), an audit trail disk process (for maintaining and updating the audit trail file), and a transaction monitor process (responsible for, among other things, creating the audit trail file). In this actual implementation, the data disk process generates audits that are passed to the audit trail disk process for update of the audit trail file.

However, since the actual environment in which the present invention is not believed necessarily relevant to the understanding and use of the invention, and in order not to unduly complicate the description of the invention, the invention is described in the context of a single processor and associated input/output (I/O) system, running an application management process, and a disc process. The application management process performs the creation of both the database and the audit trail file through the services of the disk process, and has the responsibility of maintaining and updating both. For those interested in the actual environment with which this invention is used, reference may be made to application Ser. No. 08/377,075 for "Multi-Volume Audit Trails for Fault Tolerant Computers," filed concurrently herewith, and assigned to the assignee of this application.

Referring now to FIG. 1, there is illustrated a processing system, designated generally with the reference numeral 10, comprising a central processing unit (CPU) 12, including a memory 14, coupled by an I/O bus 18 to a secondary storage 15 that includes a disk system 16. Although not shown, it will be appreciated that the secondary storage 15 can also include other storage mediums, such as tape, or semiconductor. In addition, the secondary storage 15 may share the I/O bus 18 with other peripheral devices (e.g., communications devices, printers, terminals, and the like). Data, control information, and the like are communicated between the CPU 12 and disk system 16 via the I/O bus 18 in conventional fashion. It will be appreciated that multiple disk units may be used to form the disk system 16.

The CPU 12 may have running (for example, using conventional time-share or multi-tasking techniques) application or other programs or "processes" P1, P2, ..., Pn, including a service (disk) process Pi. Associated with each process P1, ..., Pn, and stored in the memory 14, may be a data structure D1, ..., Dn.

Assume, for example, the process P1 is a database management process, responsible for managing and maintaining a database that is stored on the disk system 16. In addition, and as is often conventional, an associated audit trail file will be created and periodically updated by the database process P1. Both the database and the audit trail file may be stored on the disk system 16, but preferably on different disk units for reasons of improved performance and fault tolerance. In order to access either, the database process P1 will use the services of a disk process Pi. The disk process Pi is structured to perform the operations necessary to initiate accesses to the disk system, in accordance with requests for such access, to create, move, purge (delete), modify files, or other related operations. Thus, for example, the database managed by the database process P1 will send the requests to the disk process Pi necessary to first create the database file on the disk system 16. Subsequently, as the database process P1 manages and maintains the database, it will send additional requests to the disk process Pi to perform these tasks.

Files stored in secondary storage 15 of the processing system 10 use the naming convention described above of component, sub-volume, file name to identify the storage space within the secondary storage 15 of those files. Thus, the database created and maintained by the database process P1 would be identified by the physical disk unit at which it is stored, together with a sub-volume qualifier, and a file name. The audit trail file created to maintain the history of any and all changes, modifications, etc. to the database managed by the database process P1 would be similarly created, maintained, and named. As indicated above, although the database and its associated audit trail file could be stored on the same medium (i.e., disk unit) in secondary storage 15, it is preferred that they be kept at different units.

Figure 2:
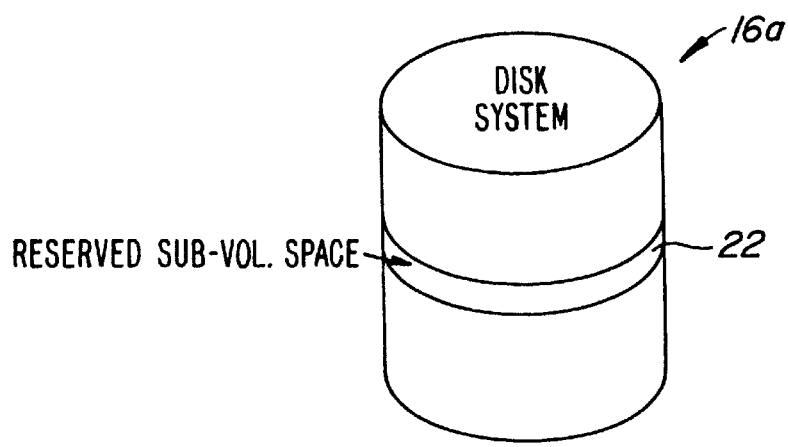
FIG. 2 is a conceptual representation of the portion of secondary storage space of FIG. 1, in the form of a disk system, that includes the sub-volume space reserved for system-critical files according to the teachings of the present invention.

Turning for the moment to FIG. 2, there is illustrated a disk unit 16a the disk unit forming that part of secondary storage containing the Reserve sub-volume space 22. It should be appreciated that the Reserve sub-volume space 22, as shown in FIG. 2, is not a physical partition of the disk unit 16a, but is a conceptual representation of the Reserve sub-volume space 22 only; it is a name space, not a physical location on any medium.

Continuing with FIG. 2, the disk process P1, as is conventional, is structured to determine from requests for access to secondary storage where in the storage space of the secondary storage 15 the access is to be made from the component/sub-volume/file name that accompanies the request. The disk process also identifies the requesting process, the type of access requested, and whatever other information its needs to perform the request. In addition, if the request is to modify a file with the sub-volume 22 qualifier, the disk process P1 will determine if the request has a "Right" to make such request from the request. If the request does not identify the Right, the request is denied, and the requesting process will be so notified.

Processes P1, P2, ..., Pn may obtain the Right to modifying access by making a call to a system library procedure specifically for granting that Right. The called system library procedure, in turn, will access the data segment D associated with the calling process, and set a bit in a Flag Word that forms a part of the data segment to a particular state. Only those processes (e.g., the database process P1 of the above example) are structured to make such calls, so that only those processes needing modifying access to files in the Reserve sub-volume space 22 of secondary storage can obtain the Right.

As an example, assume that the database process P1 will want to protect the audit trail file associated with the database it is maintaining. In order to effect such protection, the database process P1 will want to create and maintain the audit trail file in the Reserve sub-volume space 22 to prevent unauthorized modifying access to that file. Accordingly, in order to gain the Right to make such access to create the audit trail file, the database process P1 will make a system library procedure call to a predetermined procedure which will, when called, modify the Flag Word of the data segment D1 stored in memory 14, and associated with the process P1, to modify the bit of the Flag Word. The modification will set the Flag bit to a state that identifies the database process P1 as having a Right to make modifying accesses to the Reserve sub-volume space of secondary storage 16, i.e., the sub-volume space 22.

When the database process P1 creates, or subsequently modifies, the audit trail file associated with the database is managing, the database process P1 will form a request message to be forwarded to the disk process Pi. The access request message will be formed by using certain information from the data segment D1 associated with the database process P1, including the Flag Word. Thus, when the access request message is received by the disk process Pi, the message will be inspected in order to determine what is requested. At the time of inspection, if the disk process Pi determines that the request is for a modifying access to the Reserved sub-volume 22, it will also check to see if the Right Flag bit is set. If not, the request will be refused, and not acted upon. If, however, the bit is set to the requisite state, the request will be honored.

In summary, there has been disclosed a mechanism for protecting system-critical files kept in a storage space from inadvertent modifying access by reserving modifying access to only those processes having the need to do so. Although the invention has been described in the context of a simplistic database management system, it will be evident to those skilled in the art that the invention can be used in connection with maintaining and similarly protecting other system-critical files. For example, although the invention has been described in terms of its use in protecting audit trail files, the invention is just as applicable for use in similarly protecting other system-critical files such as password files, or database catalog files.

What is claimed is:

1. In a data processing system of a type including a processing unit communicatively coupled to an external storage system arranged to store data files in one or more sub-volume spaces, the processing unit operating in response to a number of application processes, including a storage process responsible for making accesses to the storage system in response to requests therefor by ones of the number of application processes, a method of protecting against inadvertent modification or creation of files in a reserved one of the sub-volumes, the method comprising the steps of:

providing each of the processes needing modifying access to the reserved one of the sub-volumes with an identification; and requesting access to the reserved one of the sub-volumes through the storage process with the identification;

for requests seeking modifying access to the reserved one of the sub-volumes, the storage process checking the identification and refusing access if the identification is not for a modifying access, and granting access if the identification so permits.

2. The method of claim 1, wherein the step of requesting access includes forming a request message that is communicated to the storage process.

3. The method of claim 2, wherein the processing system includes a memory for storing data, and the step of forming the request message includes retrieving from the memory message data including the identification.

4. The method of claim 3, wherein the providing step includes calling to a system library procedure for the identification.

5. The method of claim 4, wherein the step of calling the system library procedure includes modifying the message data in the memory to provide the identification.

6. The method 5, wherein the message data includes a flag bit, and the step of calling the system library procedure includes changing the flag bit of the message data to a state that is indicative of the identification.

7. The method of claim 1, wherein the requesting step includes providing the storage process a name of a sub-volume for which access is requested, and the checking step includes checking the provided name to see if the reserved one of the sub-volumes is requested to be accessed.

8. The method of claim 1, including the step of calling a library procedure to obtain the identification.

9. The method of claim 1, including the step of providing the storage system with magnetic media to store at least a number of the sub-volume spaces and the reserved one of the sub-volumes.

10. The method of claim 9, including the step of providing the magnetic media with a disk unit for storing certain ones of the number of the sub-volume spaces and the reserved one of the sub-volumes.

11. In a data processing system of a type including a processing unit and a storage system arranged to store data files in one or more sub-volume spaces, including a reserved sub-volume, each identified by a sub-volume name, the processing unit operating in response to a number of application processes, including a storage process responsible for making accesses to the storage system in response to requests therefor by ones of the number of application processes, a method of protecting against inadvertent modification or creation of files in the reserved sub-volume, the method comprising the steps of:

each of the processes needing modifying access to the reserved sub-volume first calling a library procedure to obtain an identification;

requesting access to a one of the sub-volumes through the storage process with a sub-volume name corresponding to the one of the sub-volumes and the identification; and the storage process checking the sub-volume name and, if the sub-volume name corresponds to the reserved sub-volume, also checking the identification and granting access if the identification so permits and refusing access otherwise.

12. The method of claim 11, wherein the processing unit includes a storage memory, and including the step of each of the processes maintaining in the memory a data structure, and wherein the calling step includes the library procedure writing the identification to the data structure.

13. The method of claim 12, wherein the requesting step includes providing at least a portion of the data structure, including the identification, to the storage process.

14. The method of claim 13, wherein the requesting step includes forming a request message that is communicated to the storage process.

15. The method of claim 14, wherein the request message is formed to include the sub-volume name and the portion of the data structure.

* * * * *